(12) United States Patent
Lioy

(10) Patent No.: US 7,860,088 B2
(45) Date of Patent: Dec. 28, 2010

(54) CONCURRENT INTERNET PROTOCOL CONNECTIVITY TO AN ACCESS TERMINAL AND A TETHERED DEVICE

(75) Inventor: Marcello Lioy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 798 days.

(21) Appl. No.: 11/394,782

(22) Filed: Mar. 31, 2006

(65) Prior Publication Data

US 2007/0127520 A1 Jun. 7, 2007

Related U.S. Application Data

(60) Provisional application No. 60/742,155, filed on Dec. 1, 2005.

(51) Int. Cl.
*H04L 12/56* (2006.01)
(52) U.S. Cl. .................................. 370/389; 370/401
(58) Field of Classification Search ............... 370/338, 370/389, 392–393, 400–401, 463–464; 709/230, 709/245, 246
See application file for complete search history.

(56) References Cited

U.S. PATENT DOCUMENTS

| | | | | |
|---|---|---|---|---|
| 6,708,219 | B1 * | 3/2004 | Borella et al. | 709/245 |
| 2004/0057441 | A1 * | 3/2004 | Li et al. | 370/401 |
| 2004/0111494 | A1 * | 6/2004 | Kostic et al. | 709/249 |
| 2008/0304501 | A1 * | 12/2008 | Park et al. | 370/401 |

FOREIGN PATENT DOCUMENTS

WO 03017705 2/2003

OTHER PUBLICATIONS

Asadullad A Ahmed: "ISP IPv6 Development Scenarios in broadband access networks: draft-ietf-v6ops-bb-deployment-scenarios-04.txt" IETF Standard-working-draft, Internet Engineering Task Force, IETF, CH, vol. v6ops, No. 4, Oct. 20, 2005, XP015042746.
Cocquet P: "IPv6 on DSL: The Best Way to Develop Always-on Services" Proceedings of the IEEE, IEEE. New York, US, vol. 92, No. 9, Aug. 2004, pp. 1400-1407, XP011116497.
Eggert L: "Re: CFR: bridge locking" FreeBSD Mailing List, Online Aug. 20, 2003 pp. 1-2, XP002460095.
International Search Report—PCT/US06/061532, International Search Authority—European Patent Office—Dec. 7, 2007.
Touch J D et al: "TetherNet Anti-NAT-Secure Internet subnet rental system" Proceedings Darpa Information Survivability Conference and Exposition IEEE Comput. Soc Los Alamitos, CA, USA, vol. 2, 2003, pp. 112-114 vol. 2, XP002460096.

* cited by examiner

*Primary Examiner*—Ricky Ngo
*Assistant Examiner*—Pao Sinkantarakorn
(74) *Attorney, Agent, or Firm*—François A. Pelaez

(57) ABSTRACT

Using split interfaces for Internet Protocol version 6 (IPv6) and Internet Protocol version 4 (IPv4), and bridging the IPv4 interface, makes it possible to support a Tethered Device (TD) and an Access Terminal (AT) having concurrent IP connectivity. This configuration enables the support of IP Multimedia Subsystem (IMS) applications in the AT using IPv6 while concurrently supporting general Internet usage on a TD. It is also possible to bridge an IPv6 interface to the TD.

17 Claims, 1 Drawing Sheet

CONCURRENT INTERNET PROTOCOL CONNECTIVITY TO AN ACCESS TERMINAL AND A TETHERED DEVICE

CLAIM OF PRIORITY UNDER 35 U.S.C. §119

The present Application for Patent claims priority to Provisional Application No. 60/742,155 entitled "Method For Supporting Concurrent IP Connectivity To An Access Terminal And Tethered Device Each Using Different IP Protocols In CDMA 2000 Networks," Filed Dec. 1, 2005, and assigned to the assignee hereof and hereby expressly incorporated by reference herein.

BACKGROUND

1. Field

The present disclosed embodiments relates generally to cellular communications, and more specifically to concurrent Internet Protocol (IP) connectivity to an Access Terminal (AT) and a Tethered Device (TD).

2. Background

It is desirable to support one Internet Protocol (IP) protocol to an Access Terminal (AT) and another to a Tethered Device (TD). An example of where this is desirable is with the launch of the new IP Multimedia Subsystem (IMS) services, which will provide a rich set of new Multimedia services in the mobile environment. One of these services will be the Voice over IP (VoIP), which will replace traditional circuit switched voice, which is how voice services are supported today. In order to support these IMS services, an AT must be continuously connected to the IP Network, which is also known as "always-on." Typically in the case for Code Division Multiple Access (CDMA) 2000 networks this implies that it is not possible to support a TD as the AT is already in a data session.

There is therefore a need in the art for concurrent IP connectivity to an AT and a TD.

SUMMARY

Using split interfaces for Internet Protocol version 6 (IPv6) and Internet Protocol version 4 (IPv4), and bridging the IPv4 interface, makes it possible to support a TD and an AT having concurrent IP connectivity. This configuration enables the support of IMS applications in the AT using IPv6 while concurrently supporting general Internet usage on a TD. It is also possible to bridge the IPv6 interface to the TD.

DETAILED DESCRIPTION

Figure 1:
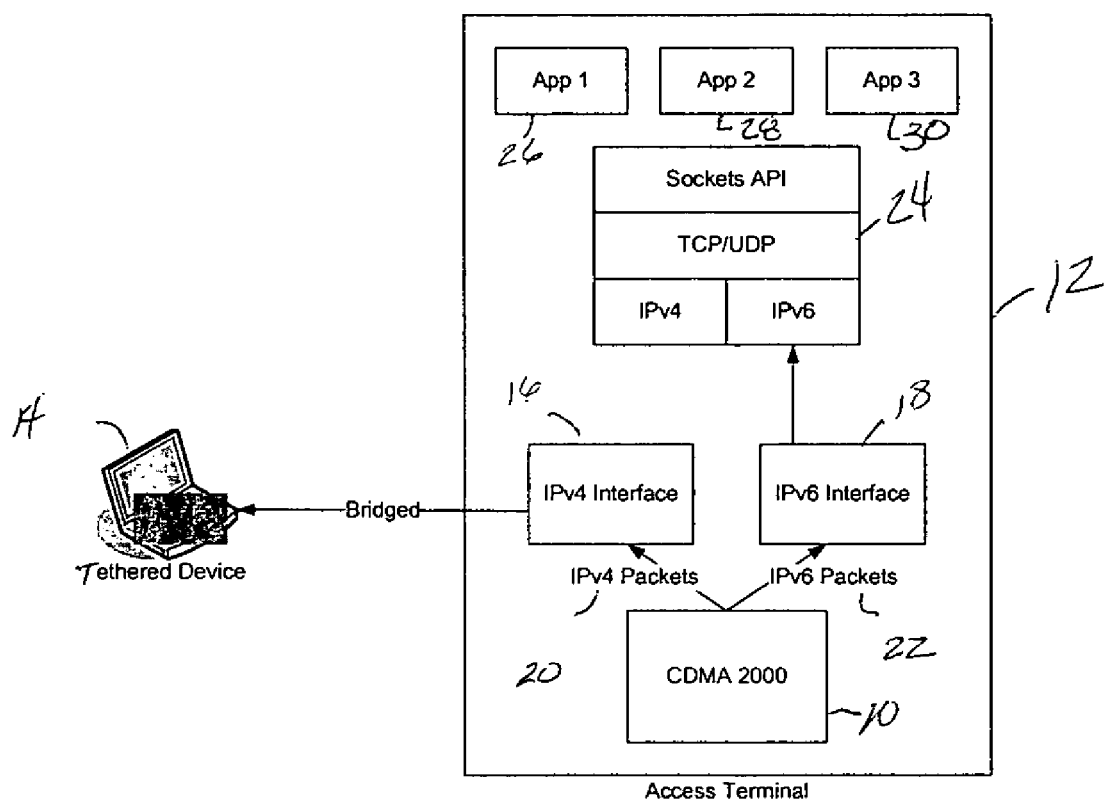
FIG. 1 is an illustration of a concurrently connected Access Terminal and Tethered Device.

The embodiments described herein make it possible to provide service concurrently to the AT and TD. Different IP protocol versions can be used by the AT and TD. In the case of IMS, it is desirable to use IP version 6 (IPv6) for the AT in order to be always on an assigned IP for as long as the AT is powered on. In order to support a wide scale deployment of these services, it would require as many IP addresses as there are ATs. In the case of IPv4 there is a dearth of addresses, so IPv6 is preferred for the AT.

For most general Internet services, such as web browsing and email, still use IP version 4 (IPv4). Thus for the TD it is desirable to have IPv4 connectivity.

The embodiments described below with reference to FIG. 1 describe how to provide IPv6 in the AT while concurrently supporting IPv4 to a TD. However, the same technique could be used to provide IPv4 to the AT and IPv6 to the TD.

IP packets arriving over an air interface 10 and based on an IP version are received by an AT 12 and are either forwarded up an AT stack 24 (for example, IPv6 packets 22) or forwarded to a TD 14 (for example, IPv4 packets 20).

There are a variety of ways this could be done:
1. Examine the incoming packets and apply the forwarding as described in the paragraph above.
2. Use the notion of Network Interfaces, which provide an abstraction layer, between the physical layer (in this case the CDMA2000 air interface data protocols, such as Radio Link Protocol (RLP) and Point-to-Point Protocol (PPP)) and the generic IP stack above (commonly referred to as the Transmission Control Protocol/Internet Protocol (TCP/IP) suite). This is described in more detail below.

The use of the Network Interface can provide a variety of processing options with respect to IP packets passing through them, such as filtering and routing/bridging information.

It is possible in the interface itself to identify whether or not packets should be forwarded directly to another interface without processing them further. This further processing is typically done at the IP layer, and consists of routing. Routing is the act of examining the IP addresses in the header and determining if the packet is destined for the local host, which is the device doing the routing, or another host. Typically if it is intended for another host, a determination may need to be made over which link to transmit it—if there are multiple links. If the interface is configured to directly forward the packets to another interface (or link), this is referred to as bridging the two interfaces together. This is typically used when it is known that all of the packets arriving in one interface must be transmitted over another interface, regardless of the addressing information they contain. An example of this is a Wireless LAN bridge. Any packets arriving on the Ethernet interface must be forwarded over the WLAN interface without exception.

In an AT it is desirable to have separate network interfaces for IPv4 and IPv6 as there is much information for each protocol that is independent, but needs to be duplicated, such as the state of the interface (disabled, available, configuring, etc.), IP address(es), and so forth.

Using the properties of bridging and the separation of the IPv6 and IPv4 interfaces allows an IPv4 interface 16 to be set up in bridging mode such that it forwards all IPv4 packets 20 to the TD, while leaving an IPv6 interface 18 in non-bridged mode, which results in the IPv6 packets 22 being delivered to the IP stack 24, and the payload ultimately being delivered to the IMS application. This allows IPv6 IMS applications 26, 28, and 30 on the AT 12 to work concurrently with generic IPv4 Internet applications on the TD 14.

Using this split interface/bridging solution, it is also possible to run IPv6 addresses on the TD 14 while supporting IPv4 applications on the AT 12.

When it becomes desirable to support IPv6 applications on the TD 14 as well, because the IPv6 packets are going to the IP layer 24 they could be routed to the TD as well if they are not destined for the AT 12, but rather for the TD. This would allow both IPv4 and IPv6 applications on the TD running concurrently with IPv6 applications running on the AT.

What is claimed is:

1. A wireless communication Access Terminal for having concurrent Internet Protocol Activity with a Tethered Device, the Access Terminal comprising:
   an air interface configured to receive incoming packets, the incoming packets comprising one or more first Internet Protocol version packets and one or more second Internet Protocol version packets;

an Internet Protocol stack;
a first Internet Protocol version interface adapted in a non-bridged mode for delivering first Internet Protocol version packets to the Internet Protocol stack; and
a second Internet Protocol version interface, split from the first Internet Protocol version interface, and adapted in a bridged mode for connecting to the Tethered Device, the second Internet Protocol version interface being configured to forward second Internet Protocol version packets to the Tethered Device;
wherein the air interface is configured to determine whether each incoming packet is a first Internet Protocol version packet or a second Internet Protocol version packet, and to forward the incoming packet to the first Internet protocol version interface or the second Internet Protocol version interface, respectively, based upon this determination; and
wherein the second Internet Protocol version interface forwards second Internet Protocol version packets to the Tethered Device concurrently with the first Internet Protocol version interface forwarding first Internet Protocol version packets to the Internet Protocol stack.

2. The Access Terminal of claim 1, wherein the first Internet Protocol version interface comprises an Internet Protocol version 6.

3. The Access Terminal of claim 2, wherein the second Internet Protocol version interface comprises an Internet Protocol version 4.

4. The Access Terminal of claim 1, wherein the first Internet Protocol version interface comprises an Internet Protocol version 4.

5. The Access Terminal of claim 4, wherein the second Internet Protocol version interface comprises an Internet Protocol version 6.

6. The Access Terminal of claim 1, wherein at least one of the first Internet Protocol version interface and the second Internet Protocol version interface comprises an abstraction layer between the air interface and the Internet Protocol stack.

7. The Access Terminal of claim 1, wherein the first Internet Protocol version interface is further configured to determine that a received first Internet Protocol version packet is destined for the Tethered Device, and to route the first Internet Protocol version packet destined for the Tethered Device to the Tethered Device using the Internet Protocol layer of the Internet Protocol stack.

8. The Access Terminal of claim 1, wherein the second Internet Protocol version interface is configured to forward second Internet Protocol version packets directly to the Tethered Device without processing by the Internet Protocol stack.

9. A method for providing an access terminal concurrent Internet Protocol activity with a tethered device, comprising:
receiving, at an air interface, incoming packets, the incoming packets comprising one or more first Internet Protocol version packets and one or more second Internet Protocol version packets; and
determining, by the air interface, whether each incoming packet is a first Internet Protocol version packet or a second Internet Protocol version packet, and to forward the incoming packet to a first Internet protocol version interface or a second Internet Protocol version interface, respectively, based upon this determination;
wherein first Internet Protocol version interface is adapted in a non-bridged mode for delivering first Internet Protocol version packets to an Internet Protocol stack;
wherein the second Internet Protocol version interface is split from the first Internet Protocol version interface, and is adapted in a bridged mode for connecting to the tethered device, the second Internet Protocol version interface being configured to forward second Internet Protocol version packets to the tethered device; and
wherein the second Internet Protocol version interface forwards second Internet Protocol version packets to the tethered device concurrently with the first Internet Protocol version interface forwarding first Internet Protocol version packets to the Internet Protocol stack.

10. The method of claim 9, wherein the first Internet Protocol version interface comprises an Internet Protocol version 6.

11. The method of claim 10, wherein the second Internet Protocol version interface comprises an Internet Protocol version 4.

12. The method of claim 9, wherein the first Internet Protocol version interface comprises an Internet Protocol version 4.

13. The method of claim 12, wherein the second Internet Protocol version interface comprises an Internet Protocol version 6.

14. The method of claim 9, wherein at least one of the first Internet Protocol version interface and the second Internet Protocol version interface comprises an abstraction layer between the air interface and the Internet Protocol stack.

15. The method of claim 9, wherein the first Internet Protocol version interface is further configured to determine that a received first Internet Protocol version packet is destined for the tethered device, and to route the first Internet Protocol version packet destined for the tethered device to the tethered device using the Internet Protocol layer of the Internet Protocol stack.

16. The method of claim 9, wherein the second Internet Protocol version interface is configured to forward second Internet Protocol version packets directly to the tethered device without processing by the Internet Protocol stack.

17. An apparatus, comprising:
means for receiving, at an air interface, incoming packets, the incoming packets comprising one or more first Internet Protocol version packets and one or more second Internet Protocol version packets; and
means for determining, by the air interface, whether each incoming packet is a first Internet Protocol version packet or a second Internet Protocol version packet, and to forward the incoming packet to a first Internet protocol version interface or a second Internet Protocol version interface, respectively, based upon this determination;
wherein first Internet Protocol version interface is adapted in a non-bridged mode for delivering first Internet Protocol version packets to an Internet Protocol stack;
wherein the second Internet Protocol version interface is split from the first Internet Protocol version interface, and is adapted in a bridged mode for connecting to the tethered device, the second Internet Protocol version interface being configured to forward second Internet Protocol version packets to the tethered device; and
wherein the second Internet Protocol version interface forwards second Internet Protocol version packets to the tethered device concurrently with the first Internet Protocol version interface forwarding first Internet Protocol version packets to the Internet Protocol stack.

* * * * *